United States Patent Office 2,788,321
Patented Apr. 9, 1957

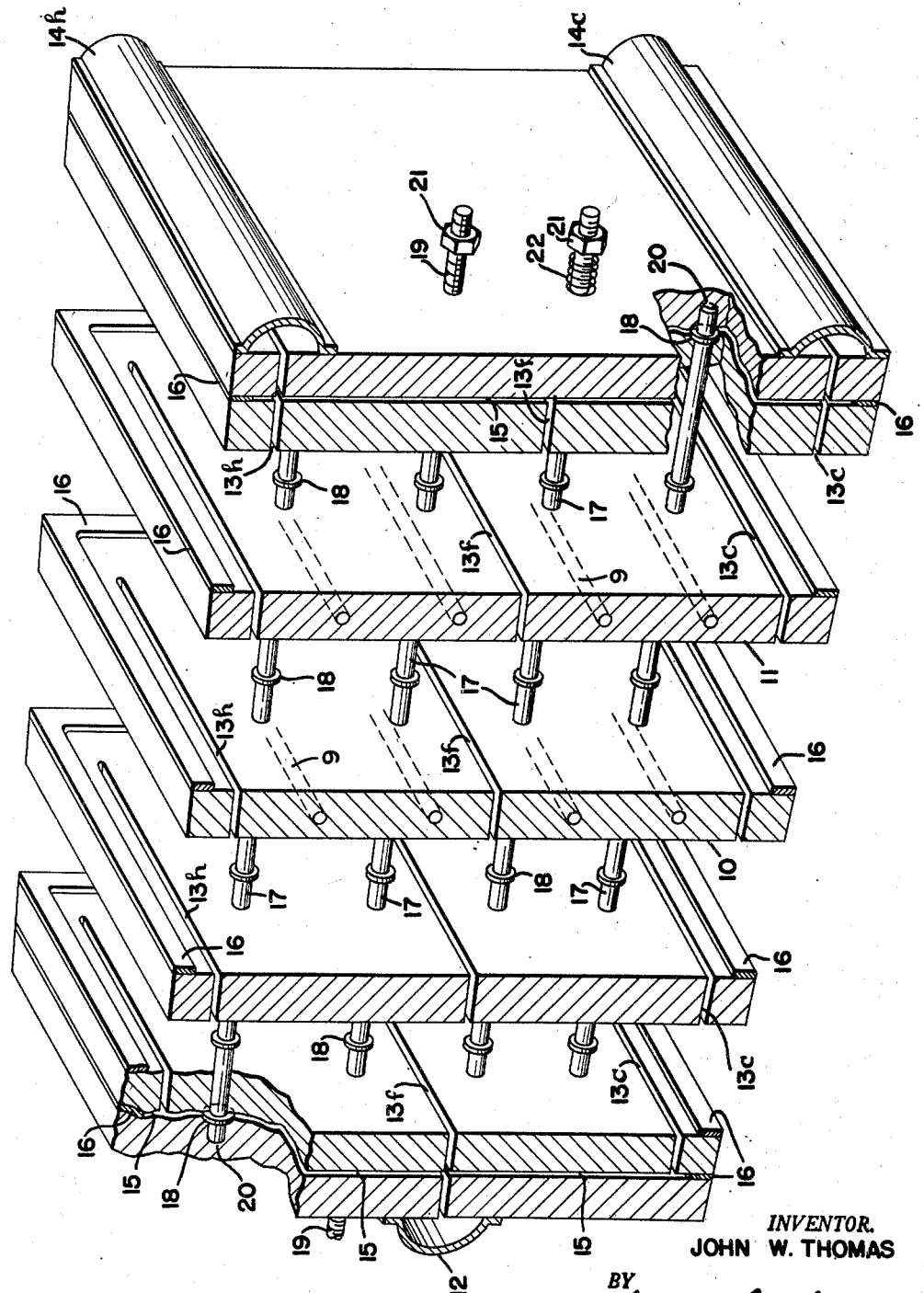

2,788,321

THERMAL DIFFUSION APPARATUS

John W. Thomas, Cleveland Heights, Ohio, assignor to The Standard Oil Company, Cleveland, Ohio, a corporation of Ohio Application February 23, 1954, Serial No. 411,708

5 Claims. (Cl. 210—176)

The present invention relates to an improvement in liquid thermal diffusion apparatus and particularly to spacers in such apparatus for maintaining a uniform slit width therein.

The separation by thermal diffusion of liquid mixtures, a term intended herein to include the separation of mixtures and solutions liquid under operating conditions into two or more fractions enriched or impoverished, as the case may be, in one or more of the components of the liquid mixture, is carried out in apparatus essentially comprising means for forming two liquid impervious opposed surfaces or a series of such surfaces that are smooth and spaced substantially equidistantly from one another to form a narrow slit or series of such slits, preferably having a width no greater than about 0.15 inch, in which slit or slits the thermal diffusion takes place. Means are provided to maintain the opposed surfaces at different temperatures so as to establish a temperature gradient across each slit, one of the walls being referred to as the "hot" wall and the other as the "cold" wall, the terms "hot" and "cold" being used in their relative rather than their absolute sense. Any flow pattern through the slit may be used. For example, the liquid to be fed may be introduced into the slit at various points, such as in the center, and the products withdrawn from the ends. Alternately the feed may be at one end and the withdrawal at the other end. The opposed surfaces may be operated with the slit in a vertical or horizontal position or at any angle.

The success of a separation by liquid thermal diffusion depends to a considerable extent upon the width and the uniformity in width of the slit across which the temperature gradient is maintained. If the width of any portion of this slit exceeds about 0.15 inch, the thermal diffusive forces in that portion of the slit become so small as to make the rate and degree of separation therein practically negligible with resultant lowering of the efficiency of the apparatus. On the other hand, the slit-forming faces must be prevented from touching or from coming so close to one another so as to block or interfere seriously with the flow of liquid through the slit. As a result, it has been considered necessary to manufacture thermal diffusion apparatus with extremely small tolerances.

In manufacturing thermal diffusion apparatus of the flat-plate type, it has been usually considered necessary to carefully machine the opposed surfaces so as to insure the uniformity of slit width. It has been found that in spite of all the precautions taken in the manufacturing of the flat plate thermal diffusion apparatus, conditions arise during operation which interfere with the maintenance of a substantially uniform slit width. These conditions most frequently arise as a result of expansion or contraction of the slit-forming walls due to the thermal forces imposed on these walls by the heating and cooling mediums. The expansion of one of the opposed walls may be sufficient to cause the wall to bow inwardly toward the opposite wall and either touch said wall, thus sealing the slit completely so that all liquid flow in the slit is thereby stopped, or comes so near to touching as to restrict materially said liquid flow, resulting in a considerable reduction in the efficiency of separation in the slit. Similarly, the wall may warp and bow outwardly resulting in too wide a slit.

The present invention is addressed particularly to the problem arising from the strict requirements of liquid thermal diffusion methods and provides a solution to this problem that is at once simple and effective.

In accordance with the present invention, a thermal diffusion apparatus is comprised of a plurality of liquid impervious walls, the walls being alternately heated and cooled, the opposed faces of which are smooth and spaced substantially equidistant from one another so as to form a narrow slit. The several slits may be manifolded together or not. A plurality of holes are drilled through the plates comprising the apparatus and rods or bars are inserted through these holes. These rods or bars serve as supports for a spacer, much like a washer, which is inserted between the plates and is held in position by the rod or bar. The shape of the spacers is not critical and they may be constructed of any material, such as glass, metal, plastic, or the like, that is inert or impervious to the liquid mixtures and to the components thereof, under the conditions of operation, and they should be substantially incompressible, not in the absolute sense but in the sense that under the conditions of operation, they should not be compressible to more than a small fraction of their operative dimensions. Likewise, the rods or bars may be manufactured from any suitable material, such as metal, plastic, and the like, which are suitable under the conditions of operation.

It is unexpected that the rods and spacers of this invention are as effective and desirable as they are because they occupy a substantial volume within the slit, and it was to be expected that they would interfere with the thermal diffusive forces operating within the slit and therefore would tend to reduce the efficiency of separation obtained therein.

The rods or bars which are employed to hold these spacers in position may serve a secondary function, namely to hold the various plates comprising the apparatus together. This can be done by machining the rods or bars so that fastening means may be attached to their ends for the purpose of applying compressive forces to the plates and, if desired, springs may be inserted between the fastening means and the plates to obtain more equal distribution of the compressive forces on the plates.

The number of rods employed may vary with the apparatus. In some cases a single rod, usually at or near the center, is sufficient. The number of plates may vary from two forming one slit up to any number. The plates may be flat or curved provided the slit is of uniform width.

The primary advantage of this invention is the maintenance of the slit width substantially uniform across the face of the plates, i. e. the prevention of the slit from becoming smaller or larger, without effecting appreciably the efficiency of the operation.

A further advantage of this invention is that the spacers are held in the apparatus by a means which facilitates both the assembly and disassembly of the thermal diffusion apparatus.

The invention will be more clearly understood by reference to the attached drawing which illustrates one form of the invention and shows a section cut through the center of a multi-plate thermal diffusion apparatus in perspective and partly in diagrammatic form.

The apparatus illustrated in the drawings is composed principally of a plurality of plates, such as the plates 10 and 11. The plates 10 and 11 are provided with heating or cooling means, such as the coils 9 embedded in the plates through which heating and cooling media may be circulated. The entire apparatus is assembled so that alternate plates are heated while those lying between the heated plates are cooled. In this manner, a temperature gradient is obtained across the slits formed by opposed surfaces of the plates, as shown at 15 in one pair of plates. The separation chamber is sealed by a circumferential gasket 16. A feed reservoir 12 is attached to one end of the apparatus, and product reservoirs 14h and 14c are attached to the opposite end of the apparatus. The several slits 15 wherein the separation takes place communicate with these reservoirs by means of feed ports 13f in the plates, and the products are withdrawn through outlet ports 13h and 13c which communicate with product reservoirs 14h and 14c.

In order to maintain the necessary uniform slit width mentioned hereinabove, spacers, such as the rings 18, are inserted between the plates comprising the apparatus. These spacers are held in place by means of the rods 17 which pass through the holes in the rings 18. The bars are inserted into the apparatus through holes which are drilled through the plates 10 and 11. If desired, the rods may terminate in the end plate, providing the holes in the end plate are not drilled through, as shown at 20. If the bars so terminate, suitable means must be used to clamp the plates together. Alternately, the end plates may be drilled through and the bars extended beyond the end plates. The rods can then be machined in the manner shown at 19 so as to receive bolts, such as 21. In this manner, it is possible not only to support the spacers but also to provide means for clamping together the plates comprising the apparatus. If desired, springs 22 may be inserted between the bolts 21 and the end plates so as to more equally distribute the compressive forces on the plates.

It is intended to cover all modifications and changes in the example of the invention, herein given for purposes of disclosure, which do not depart from the spirit and scope of the appended claims.

I claim:

1. A thermal diffusion apparatus comprising plates spaced apart equidistantly so as to provide a uniformly narrow slit between a pair of plates, means for heating and cooling the plates respectively on opposite sides of said slit to provide a temperature gradient across the same, means for introducing and withdrawing liquid from said slit, means for maintaining a predetermined uniform spacing between a pair of said plates comprising at least one spacer inserted between the several plates and held in position by a rod passing through said plates and said spacer, and means for urging said plates against said spacer.

2. A thermal diffusion apparatus comprising a series of plates spaced apart equidistantly so as to provide a uniformly narrow slit therebetween, means for heating alternate plates of said series and means for cooling the remainder of the plates of said series whereby a temperature gradient may be impressed across said slit, means for introducing and withdrawing liquid from said slit, means for maintaining a predetermined uniform spacing between each pair of said plates comprising at least one spacer inserted between the several plates and commonly held in position by a rod passing through all of said plates, save for the first and last of said series in which said rod terminates, and said spacer, and means for urging said plates against said spacer.

3. A thermal diffusion apparatus comprising a series of plates spaced apart equidistantly so as to provide a uniformly narrow slit therebetween, means for heating alternate plates of said series, means for cooling the remainder of the plates of said series whereby a temperature gradient may be impressed across said slit, means for introducing and withdrawing liquid from said slit, means for maintaining a predetermined uniform spacing between each pair of said plates comprising a plurality of spacers inserted between the several plates and commonly held in position by rods passing through said plates and said spacers, and means for urging said plates against said spacers.

4. A thermal diffusion apparatus comprising a series of plates spaced apart equidistantly so as to provide a uniformly narrow slit therebetween, means for heating alternate plates of said series, means for cooling the remainder of the plates of said series whereby a temperature gradient may be impressed across said slit, means for introducing and withdrawing liquid from said slit, means for maintaining a predetermined uniform spacing between each pair of said plates comprising several spacers inserted between the several plates and commonly held in position by rods passing through all of said plates, save for the first and last of said series in which said rods terminate, and said spacers, and means for urging said plates against said spacers.

5. A thermal diffusion apparatus comprising a series of plates spaced apart equidistantly so as to provide a uniformly narrow slit therebetween, means for heating alternate plates of said series and for cooling the remainder of the plates of said series whereby a temperature gradient may be impressed across said slit, means for introducing and withdrawing liquid from said slit, means for maintaining a predetermined uniform spacing between each pair of said plates comprising a plurality of spacers inserted between the several plates and commonly held in position by rods passing through said plates and said spacers, and means for urging said plates against said spacers comprising springs and bolts attached to the extremities of said rods.

References Cited in the file of this patent

UNITED STATES PATENTS

| Number | Name | Date |
|---|---|---|
| 586,593 | Chamberlain | July 20, 1897 |
| 651,546 | Hinken et al. | June 12, 1900 |
| 2,165,931 | Levy | July 11, 1939 |
| 2,459,376 | Hallinan | Jan. 18, 1949 |
| 2,541,069 | Jones et al. | Feb. 13, 1951 |
| 2,541,070 | Jones et al. | Feb. 13, 1951 |